Oct. 29, 1946.  F. H. NICOLL  2,410,300
NONREFLECTIVE FILM
Filed July 21, 1943
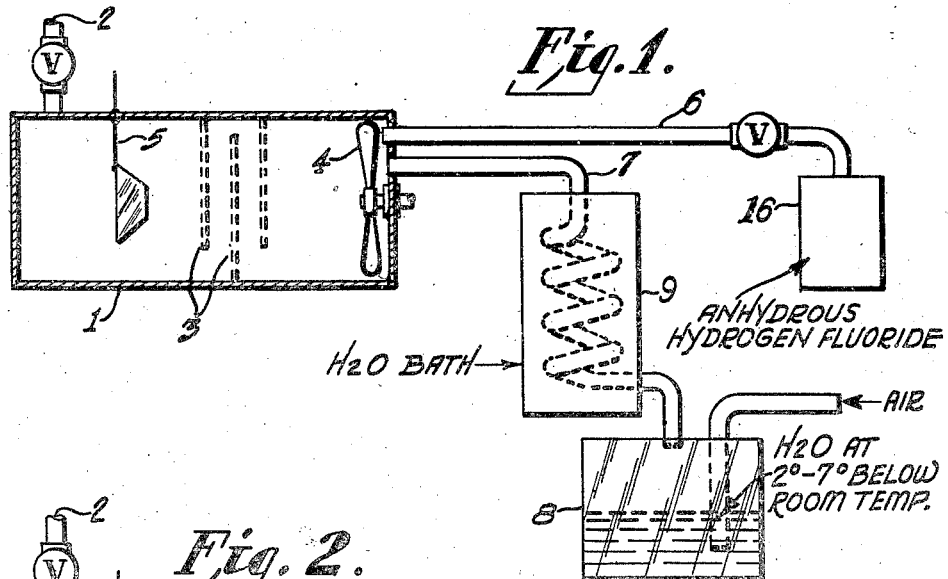
Inventor
FREDERICK H. NICOLL
By CD Tuska
Attorney Patented Oct. 29, 1946

2,410,300

UNITED STATES PATENT OFFICE 2,410,300

NONREFLECTIVE FILM

Frederick H. Nicoll, Princeton, N. J., assignor to Radio Corporation of America, a corporation of Delaware Application July 21, 1943, Serial No. 495,612

3 Claims. (Cl. 41—42)

This invention relates to optical elements or other articles which are made of glass or the like and are provided with a low reflective film of a thickness having a definite relation to the wave length of the light to be transmitted by the element or article. Such low reflective elements are disclosed by my copending application, Ser. No. 461,958, filed October 14, 1942, and by a copending application of Nicoll and Williams Ser. No. 488,938, filed May 28, 1943.

In accordance with the first copending application, Ser. No. 461,958, the surface to be made nonreflective is treated with dilute hydrofluoric acid vapor under conditions establishing substantially uniform gas concentration and distribution at the treated surface. Thus the treated surface is maintained at a temperature higher than that of the acid solution in order to prevent the condensation of moisture at the treated surface and the treatment is continued until a film layer skeletonized to the desired extent and having the desired thickness is formed. This method of treatment results in a satisfactory film layer but involves rather exact control of the temperature difference between the treated surface and the acid solution and of the concentration and distribution of the gas at the surface undergoing treatment.

These exacting requirements are largely avoided by the improvements disclosed by the second copending application, Ser. No. 488,938 in accordance with which the acid vapor at the treated surface is emanated from a solution of fluosilicic acid and the necessity of maintaining a temperature difference between the acid solution and the treated surface is avoided.

Both these types of treatment are disclosed in the aforesaid applications as practiced by what may be designated as the tray method. In this method of treatment, the surface to be made nonreflective is exposed directly to the vapor emanating from the acid solution, the common practice being to support the article to be coated some distance above the solution so that only one of its surfaces is exposed to the acid vapor. Due to non-uniformity of said vapor concentration and other causes, the tray method is not easily applicable to the treatment of all the surface of a lens or like element at once.

The present invention has for its principal object to provide an improved apparatus and method of operation whereby all surfaces of a nonreflective element may be coated readily with a nonreflective film. This improved method is distinguished from the tray method in that it involves the controlled mixing and circulation of the acid vapor and may be properly designated as a dynamic method. As will hereinafter appear, this dynamic type of treatment is equally applicable to the methods of treatment disclosed by the aforesaid applications and to other similar methods.

The invention will be better understood from the following description considered in connection with the accompanying drawing and its scope is indicated by the appended claims.

In the drawing Figure 1 is a schematic diagram illustrating an apparatus suitable for carrying the dynamic method of treatment into effect and Figures 2 and 3 are schematic diagrams of modifications of the apparatus employed in practicing the invention.

This apparatus includes a treating tank 1 provided with a valved outlet 2, with suitable baffles 3 for equalizing the concentration and distribution of the acid vapor, with a fan 4 and with one or more supports 5 for positioning the article to be coated within the tank.

From a cylinder 16, acid vapor, for example anhydrous hydrogen fluoride, is fed into the treating chamber 1 through a pipe 6 at room temperature which should be above the liquifying temperature of the particular acid used.

Through another pipe 7, air substantially saturated with water vapor is fed into the chamber 1. This water vapor saturated air may be produced in any suitable manner such as by bubbling air through water in a tank 8 maintained at a temperature which is about 7° F. below room temperature and thereafter passing it through a water bath tank 9 where its temperature is raised to that of the room.

The function of the fan 4 is to circulate and mix the vapors thus introduced into the treating tank 1. This dynamic method of operation makes it possible to treat all surfaces of the coated element at the same time and provides a substantially uniform concentration of the acid vapor at all points of the treated surfaces so that edge effects where the supports 5 contact the treated element and non-uniform thickness of the film due to variation in acid vapor concentration and other causes are largely avoided.

From the use of the tray method, it is known that a certain quantity of hydrogen fluoride is required to treat a piece of glass of predetermined size and that substantially saturated water vapor at the tray temperature is present during the treatment. In the dynamic type of treatment, this condition is achieved by saturating the air with water vapor at a temperature about 7° F. below room temperature. The time required to coat a piece of glass at a room temperature of 25° C. is about seven hours. Satisfactory operation of the dynamic type of treatment is therefore achieved if sufficient hydrofluoric acid in the gaseous form is fed into the container to produce a film in a period of the order of seven hours. The time required for the treatment, however, depends somewhat on other factors such as the character of the acid solution and can be more exactly determined by observing the film through suitable measuring apparatus during its formation.

Figure 2 is a schematic diagram of a modification of the apparatus of Figure 1. In the modification air is forced through a solution of the hydrofluoric acid. The air becomes a substantially saturated solution which is applied to the optical element to be coated substantially in the same manner as described in connection with Figure 1. Figure 3 represents another modification in which the vapor may be continuously circulated by the pump P. In this case, the air inlet valve 11 and the air exhaust valve 13 are both closed while the valve 15 to the pump P is opened. Instead of using the circulating pump, the air inlet valve 11 and the air exhaust valves 13 may be opened and the valve 15 to the pump P may be closed. When thus adjusted, the apparatus of Figure 3 performs in a manner similar to that of Figure 2.

As pointed out in the applications mentioned above, the low reflective film or layer produced by the different methods which they disclose is skeletonized, has an index of refraction appreciably lower than that of the coated article and has a thickness such that reflection of a selected component of visible light therefrom is appreciably reduced.

I claim as my invention:

1. In an apparatus for producing a reflective element having a low reflection surface comprising a layer altered by the action of a vapor emanated from an acid solution, the combination of a treating chamber, means for supporting said element within said chamber, means for introducing acid vapor into said chamber at a temperature above the liquifying temperature of said acid, air supply means, means for saturating the supplied air with water at a temperature below said acid liquifying temperature, means for raising the temperature of said water saturated air to a temperature above said acid liquifying temperature and introducing it into said chamber, and means for producing a homogenous distribution of said acid vapor and water saturated air throughout said chamber.

2. In an apparatus for producing a reflective element having a low reflection surface comprising a layer altered by the action of a vapor emanated from an acid solution, the combination of a treating chamber, means for supporting said element within said chamber, means for introducing acid vapor into said chamber at a temperature above the liquifying temperature of said acid, air supply means, means for saturating the supplied air with water at a temperature below said acid liquifying temperature, means for raising the temperature of said water saturated air to a temperature above said acid liquifying temperature and introducing it into said chamber, and means including an agitator located within said chamber for producing a homogenous mixture of said acid vapor and said water saturated air throughout said chamber.

3. In the production of a reflective element having a low reflection surface comprising a layer altered by the action of a vapor emanated from an acid solution, the method which includes supporting said article in an enclosure, introducing acid vapor into said enclosure, introducing substantially water saturated air into said enclosure, maintaining a homogenous mixture of said acid vapor and water saturated air throughout said enclosure, and establishing and maintaining an equable distribution of said mixture at said surface until said layer is of such thickness that reflection of a component of visible light therefrom is appreciably reduced.

FREDERICK H. NICOLL.